United States Patent [19]

Short, III

[11] 4,394,658

[45] Jul. 19, 1983

[54] ADAPTIVE MTI CLUTTER TRACKER-CANCELLER METHOD AND APPARATUS

[75] Inventor: Robert D. Short, III, Littleton, Mass.

[73] Assignee: Sperry Corporation, New York, N.Y.

[21] Appl. No.: 248,617

[22] Filed: Mar. 27, 1981

[51] Int. Cl.³ ............................................. G01S 13/52
[52] U.S. Cl. .................. 343/7.7; 343/5 CF; 343/5 NQ; 343/5 VQ; 343/7 PL
[58] Field of Search ............ 343/5 CF, 5 NQ, 5 VQ, 343/7 PL, 7.7

[56] References Cited

U.S. PATENT DOCUMENTS

| | | | |
|---|---|---|---|
| 3,295,127 | 12/1966 | Kross | 343/7 PL X |
| 3,480,953 | 11/1969 | Shreve | 343/7.7 |
| 3,755,813 | 8/1973 | Evans et al. | 343/7.7 |
| 3,946,382 | 3/1976 | Kossiakoff et al. | 343/5 VQ |
| 3,950,751 | 4/1976 | Orr et al. | 343/7.7 X |
| 4,137,530 | 1/1979 | Hooker, Jr. | 343/5 VQ |
| 4,243,988 | 1/1981 | Kang et al. | 343/5 VQ |

FOREIGN PATENT DOCUMENTS 2032725  5/1980  United Kingdom ............ 343/5 NQ

*Primary Examiner*—Malcolm F. Hubler
*Attorney, Agent, or Firm*—Howard P. Terry; Seymour Levine

[57] ABSTRACT

An adaptive clutter canceller for adaptively cancelling clutter with non-zero mean Doppler frequencies. Received clutter signals averaged over a predetermined number of range cells and over an azimuth extent. The resulting averaged signal is used to shift the clutter spectrum to a zero mean Doppler and subsequently cancelled.

11 Claims, 5 Drawing Figures

ADAPTIVE MTI CLUTTER TRACKER-CANCELLER METHOD AND APPARATUS

BACKGROUND OF THE INVENTION

1. Field of the Invention

The subject invention pertains to the field of radar clutter cancellation and more particularly to the adaptive cancellation of clutter with non-zero mean frequencies.

2. Description of the Prior Art

Ground based air surveillance radar systems require the elimination of unwanted echo returns, commonly referred to as clutter, to reliably detect and track airborne targets of interest. Many sources of clutter exist, however two, land and weather, are dominant and present serious impediments to tracking airborne targets. Land clutter is created by radar reflections which, with respect to the radar platform, are stationary or move at velocities that are slow relative to the velocity of the airborne targets. These reflections, therefore, exhibit a doppler shifted frequency spectrum clustered about zero frequency. Since the mean frequency of the land clutter spectrum remains at zero, all radar clutter returns may be suppressed by a fixed MTI canceller.

Weather clutter is created by reflections from wind driven clouds and precipitation, causing the main doppler frequency of the weather clutter spectrum to be non-zero. This shift of the mean doppler frequency is a function of the wind velocity, which may vary with the range-azimuth position of a target of interest. Since this doppler frequency is not known a priori, a single fixed MTI canceller cannot be designed to suppress the weather clutter. Consequently, an adaptive technique must be employed to eliminate this form of clutter.

The first adaptive MTI processors were developed for the elimination of ground clutter in airborne radar systems, which due to the velocity of the aircraft exhibit non-zero mean doppler frequencies. A system of this type, TACCAR, is described by Skolnik in "Radar Handbook", McGraw Hill, New York, 1970. Adaptive clutter rejection systems for shipborne and land based MTI systems have subsequently been utilized for rejecting chaff, sea, and weather clutter. These systems which operate at i.f. frequencies, exhibit blind speeds, utilize analog circuitry, are either extremely complicated or can be used only in a single delay line configuration, thus limiting the clutter cancellation capability, provide cancellation only on a pulse-to-pulse basis, and do not perform well with pulse compression systems.

SUMMARY OF THE INVENTION

An adaptive moving target indicator (MTI) clutter canceller in accordance with the present invention utilizes digital circuitry with I and Q processing, and may comprise a mixer coupled to receive i.f. signals from a radar receiver and signals from a voltage controlled oscillator (VCO) for providing a signal having a frequency representative of the difference between the i.f. signal frequency and the frequency of the VCO. This difference frequency is coupled to the input terminal of a delay line and to a phase comparator to which the output terminal of the delay line is also coupled. A phase comparison determines the difference in phase between the instant signal output from the mixer and the signal output therefrom preceding by a time interval corresponding to the transit time through the delay line. A signal representative of the phase difference between the instant and delayed signals is coupled to an averaging circuit, wherein an average, over a predetermined number of range bins within a range sweep, is taken and a signal representative thereof is coupled to a second averaging circuit. The second averaging circuit averages the signal representative of the average phase difference over the predetermined number of range cells over a preselected number of range sweeps, thus providing a signal representative of the phase average within a sector defined by the predetermined number of range cells and the preselected azimuth interval. This two dimensionally average phase difference is coupled to the VCO for controlling the frequency thereof.

In order to avoid target display interference due to sidelobes generated by uniformly weighting the signals in each range cell during the range averaging process, the signals from the range bins about the central range bin are weighted in accordance with a weighting function that is consistent with the target display resolution desired prior to summing in the averaging process.

DESCRIPTION OF THE PREFERRED EMBODIMENTS

Figure 1:
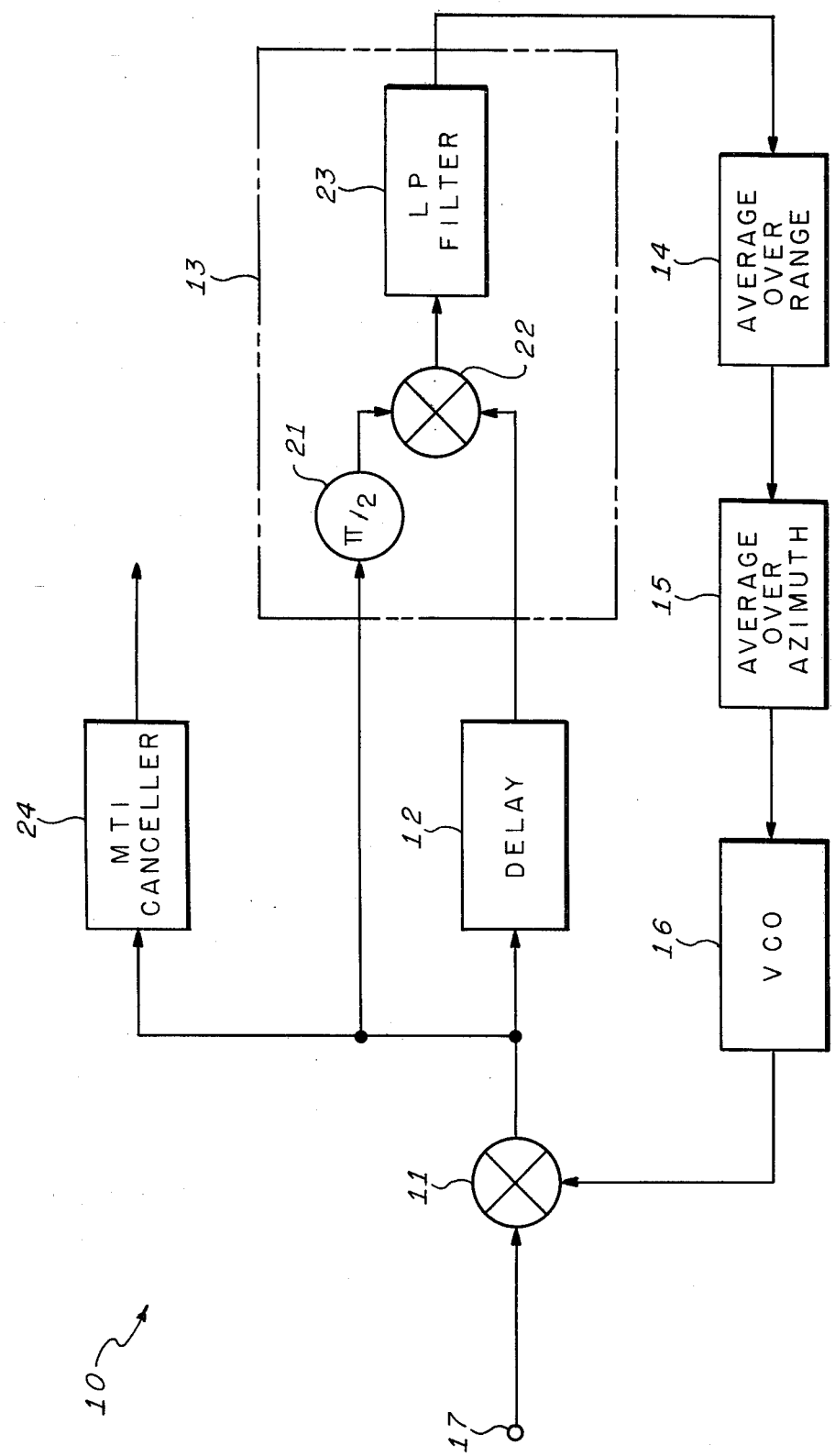
FIG. 1 is a block diagram of an adaptive MTI clutter tracker-canceller which incorporates the principles of the invention.

Referring to FIG. 1, the principal components of and adaptive MTI clutter tracker-canceller 10 includes a mixer 11, a delay line 12, a phase comparator 13, a circuit for averaging target return signal phase variations from sweep to sweep over a predetermined number of range cells 14, a circuit to average the range average phase variation over an azimuthal sector 15 and a VCO 16.

An i.f. signal from a radar receiver is coupled to an input terminal 17 of the mixer 11 wherein it is mixed with the signal coupled to the mixer 11 from VCO 16 to provide a signal having a frequency that is the difference between the i.f. signal frequency and the frequency coupled from the VCO 16. This difference signal is coupled to delay line 12 and to a 90° phase shifter 21 in the phase comparator 13, which also includes mixer 22 and lowpass filter 23. The output signals from the delay line 12 and the phase shifter 21 are coupled to mixer 22 wherefrom the resulting signals are coupled to the lowpass filter 23 from which a sequence of signals each representative of the sweep-to-sweep phase difference in a given range cell emerges. This sequence of signals is coupled to averager 14 wherein they are processed to provide a sequence of signals representative of the average sweep-to-sweep phase difference in $M+1$ range cells centered about range cells $N_0, N_1, N_2, \ldots N_N$; $N_i$, $N_{i+1}$, being contiguous range cells. The sequence of averaged signals is coupled to a second averager 15 and processed to provide a sequence of signals each representative of the average of the average phase difference about a $N_i$. Signals from averager 15 are coupled to VCO 16 wherefrom a sequence of averaged signals, at frequencies corresponding to the average phase difference over range and azimuth for each given range cell, is coupled to mixer 11. The sequence of signals coupled from VCO 16 to mixer 11 is in synchronism with the radar return during a range sweep, thus providing an output signal from mixer 11 for each range cell that is frequency shifted in accordance with the average phase variations for the range cell. When weather clutter is present in the radar return, a large portion of the spectrum of the i.f. signal coupled to input terminal 17, for a given range cell, will be located at the wind velocity determined doppler frequency $\omega_c$. If the delay time for the delay line 12 is selected to be the interpulse period of the radar, the two input signals to the phase comparator 13 are sequential azimuthal returns from the same range cell. Since $\omega_c$ is approximately constant over short range and azimuth intervals, the average of the phase difference over each range-azimuth sector will be proportional to $\omega_c$. The sequence of signals coupled from VCO 16 each has a frequency that is a function of this proportionality for the corresponding range cell. The weather clutter portion of the output signal from mixer 11 is therefore shifted to zero doppler in each range cell and a fixed MTI canceller 24 may then be used to suppress the resulting clutter as in a conventional surveillance radar system.

Figure 2A:
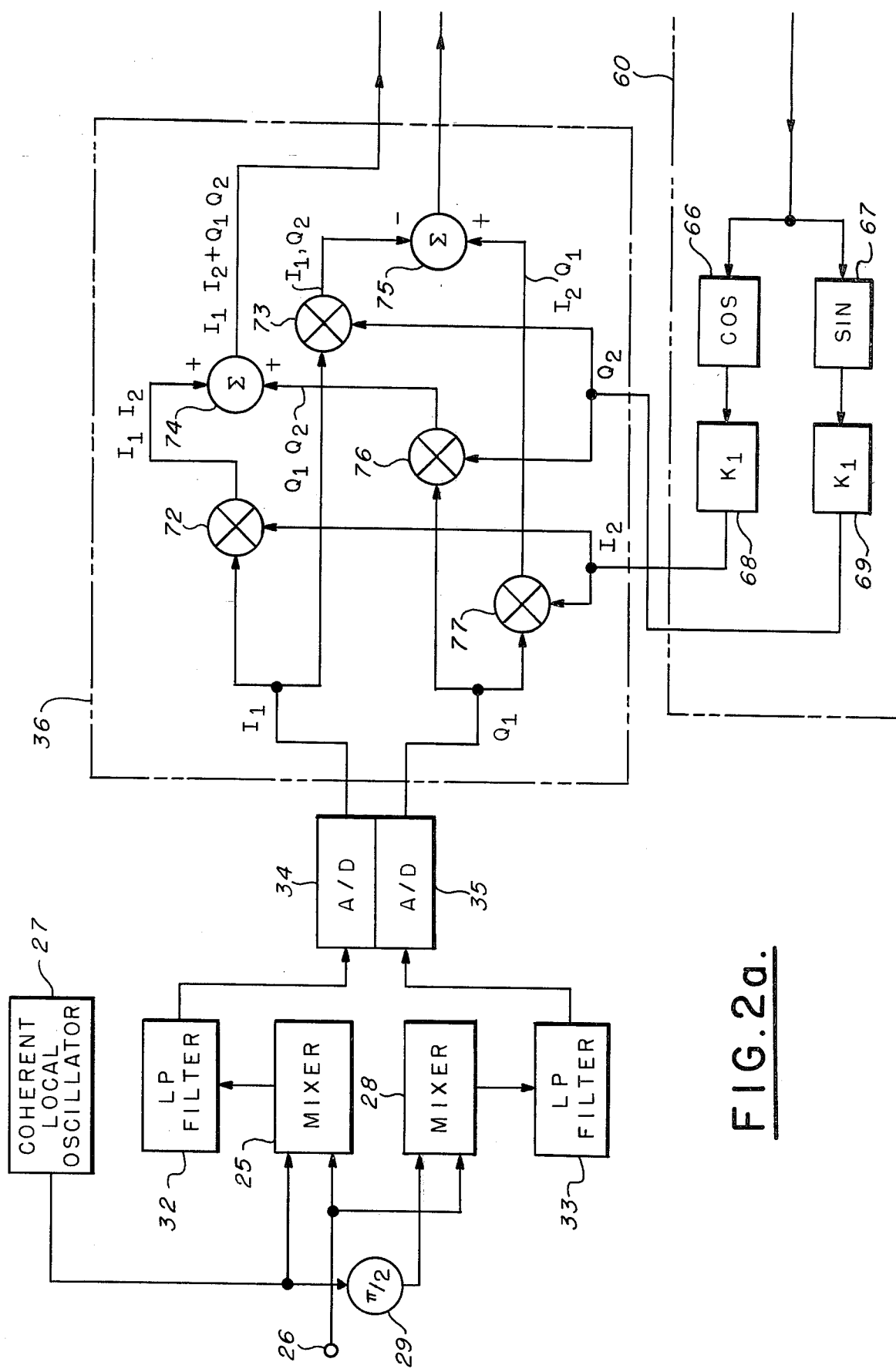
FIGS. 2a and 2b are a schematic diagram, partially in block form, of a preferred embodiment of the invention.
Figure 2B:
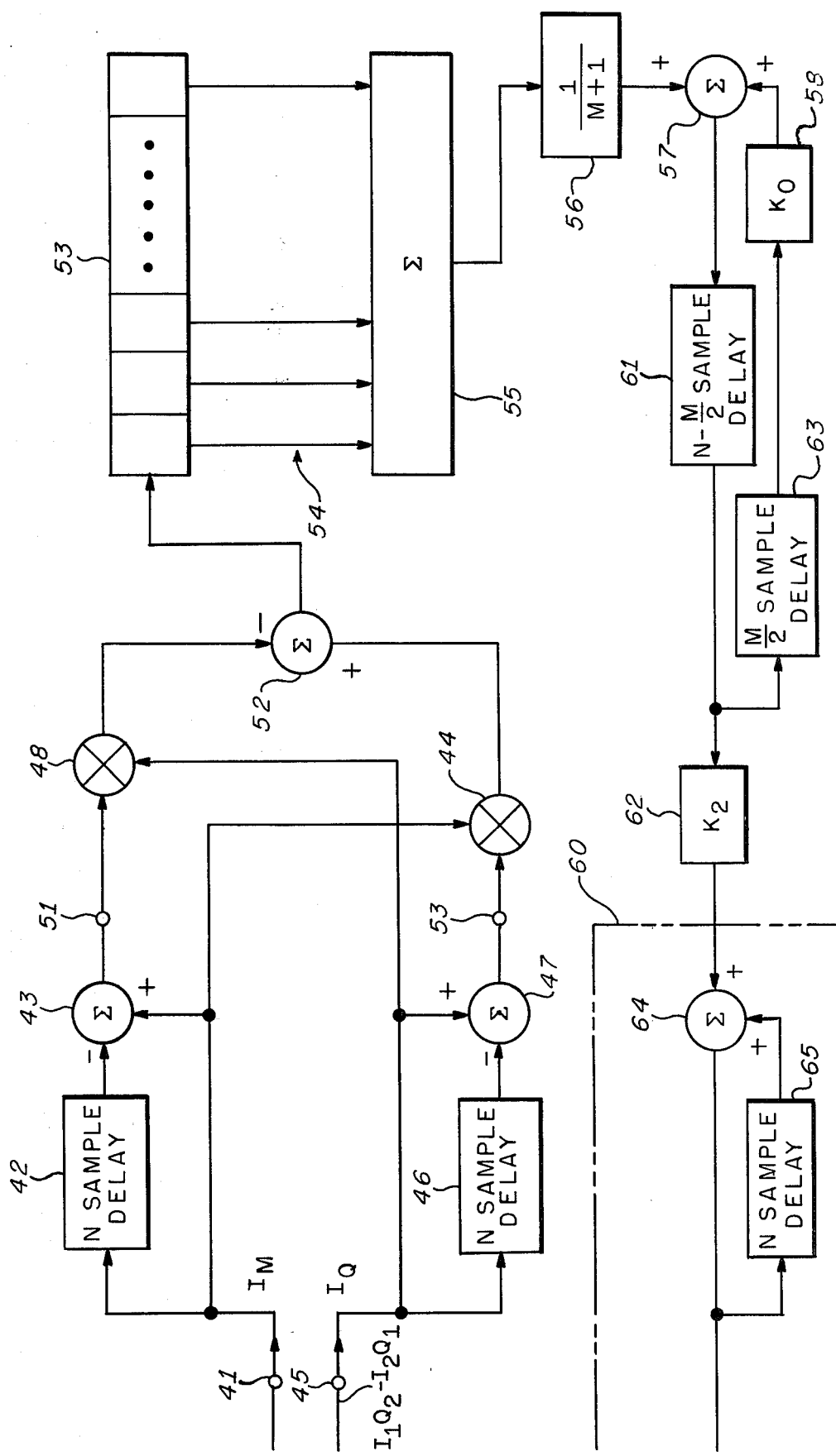

Refer now to FIGS. 2a and 2b wherein a preferred embodiment of the invention is illustrated. The input terminals of a mixer 25 are coupled to an i.f. reception terminal 26 and to the output terminal of a coherent local oscillator 27, while the input terminals of a mixer 28 are coupled to the i.f. reception terminal 26 and, through a 90° phase shifter, to the coherent local oscillator 27. Output terminals of mixers 25 and 28 are respectively coupled to filters 32 and 33, the output terminals of which are respectively coupled to analog-to-digital (A/D) converters 34 and 35, each having their output terminals coupled to a complex multiplier 36. A first output terminal of complex multiplier 36 is coupled, via terminal 41, to the input terminal of N sample delay line 42, the positive input terminal of a difference circuit 43, and to one input terminal of a multiplier 44. Similarly, a second output terminal of complex multiplier 36 is coupled, via terminal 45, to the input terminal of an N sample delay line 46, the positive input terminal of a difference circuit 47, and a multiplier 48. Output terminals of N sample delay lines 42 and 46 are respectively coupled to the negative terminals of difference networks 43 and 47. The output terminal 51 of difference network 43 is coupled to a second input terminal of multiplier 48, the output terminal of which is coupled to a negative terminal of difference network 52 and the output terminal 53 of difference network 47 is coupled to a second input terminal of multiplier 44, the output terminal of which is coupled to the positive input terminal of difference network 52. A (M+1) sample tapped delay line 53 has its input terminal coupled to the output terminal of subtraction network 52 and its parallel output terminals coupled, through lines 54, to a summation network 55, the output terminal of which is coupled to a divider network 56. A summation network 57 has one input terminal coupled to the output terminal divider network 56 and a second input terminal coupled to a constant multiplier circuit 58, while the output terminal of summation network 57 is coupled to a (N−M/2) sample delay line 61, the output terminal of which is coupled to a constant multiplier 62 and to constant multiplier 58 via a M/2 sample delay line 63. Another summation network 64 has its output terminal coupled to an input terminal thereof via a N sample delay line 65 and a second input terminal coupled to the output terminal of constant multiplier 62. The output terminal of summation network 64 is also coupled to the input terminal of VCO 60 and therefrom to the input terminals of cosine generator 66 and sine generator 67 which have output terminals coupled to the complex multiplier 36 via constant multipliers 68 and 69, respectively.

For ease of understanding and simplicity of explanation, it will be assumed that the i.f. signal at input terminal 26 is due to weather clutter only and that the frequency of this signal may be represented by the mean i.f. frequency of the clutter spectrum denoted as $\omega_c$.

Referring again to FIG. 2, an i.f. signal coupled to input terminal 26 is mixed with the output signal from the coherent local oscillator in mixer 25, the resulting signals being coupled to lowpass filter 32, from which a signal that is in-phase with the coherent oscillator signal emerges. This i.f. signal is also mixed with the signal from the local oscillator 27 phase shifted by 90° in mixer 28, the resulting signal being coupled to filter 33, from a signal that is in quadrature with the output signal of the coherent local oscillator 27 emerges. These in-phase and quadrature signals are coupled to analog-to-digital (A/D) converters from which digital versions, denoted $I_1$ and $Q_1$, respectively, emerge. $I_1$ is coupled to multipliers 72 and 73 of complex multiplier 36, to which the in-phase component $I_2$ and quadrature component $Q_2$ of the output signal from the digital VCO are also respectively coupled. The resulting product $I_1 \times I_2$, from multiplier 72, is coupled to an input terminal of a summer 74 while the resulting product $I_1 \times Q_2$, is coupled to a negative terminal of a difference network 75. Similarly, the product $Q_1 \times Q_2$ is obtained via multiplier 76 and coupled to a second input terminal of summer 74 and the product $I_2 \times Q_1$ is obtained by multiplier 77 and coupled to the positive terminal of difference circuit 75. The output signals from summer 74 and difference circuit 75 $I_1 \times I_2 + Q_1 \times Q_2 = I_M$ and $I_1 \times Q_2 - I_2 \times Q_1 = Q_M$ will be recognized by those skilled in the art as being respectively proportional to $\cos(\omega_c - \omega_o)t$ and $\sin(\omega_c - \omega_o)t$, where $\omega_c$ is the radian frequency of the i.f. signal at terminal 26, $\omega_o$ is the radian frequency of the VCO 60, and T is the sample period.

The processing is continued by coupling $I_M$ through terminal 41 to the positive input terminal of difference circuit 43, to one input terminal of multiplier 44, and to the negative input terminal of difference circuit 43 via the N sample delay 42 and coupling $Q_M$ through terminal 45 to the positive terminal of difference circuit 47, to one input terminal of multiplier 48, and via the N sample delay 46 to the difference terminal of difference network 47. Output signals from difference circuit 43 are coupled, via terminal 51, to a second input terminal of multiplier 48 while output signals from difference circuit 47 are coupled via terminal 53 to a second input terminal of multiplier 44. Signals representative of the products formed by multipliers 44 and 48 are coupled to the positive terminal and negative terminal, respectively, of difference circuit 52 wherefrom, it will be recognized, a signal proportional to $\sin(\omega_c - \omega_o)T$ emerges, T being the time delay of the N sample delay circuits 42 and 46.

The signal output from difference circuit 52 is representative of the phase difference, averaged about a sampling time, between the received weather clutter at two adjacent sampling times. This signal is actually a sequence of signals, each element in the sequence being representative of the average weather clutter phase over an azimuth interval, about a given range cell. Each range cell phase difference signal is clocked into the (N+1) delay line 53, which may be a serial input parallel output shift register, in the sequential order of arrival. Although the samples from adjacent range cells are statistically independent, the correlation statistics do not change radically over several range cells. Therefore, it is reasonable to characterize $\omega_c$ as constant over the M+1 adjacent range cells ($N_0-M/2$, $N_0+M/2$). The range cell phasse information is sequentially clocked into the shift register 53 at the range sweep rate, incrementing the center range cell by one with each clock pulse. After the center range has been incremented, the signals representative of the phase information in each of the (M+1) range cells are coupled to summation network 55 and the phase information for the next range cell in the sequence is clocked into the shift register 53 from the difference network 52. Output signals from the summation network 55 are coupled to divider 56 where a division by (M+1) is performed to couple a signal to the summation network 57 that is representative of the average phase variation between sample times over the (M+1) range cells.

The signals averaged about each range cell are added to a weighted sum of preceding averages for that range cell in summer 57. These weights are provided by multiplying each average for a range cell, in the sampled order of arrival, by increasing powers of a decay factor $K_o$, the higher order terms multiplying the earlier arriving range average phase differences. Thus establishing a signal $v_K$, for the Kth range cell, at the input terminal of constant multiplier 62 that may be expressed as $$v_K = \sum_{j=Q}^{J} (K_o)^{J-j} s_{K,j}$$

where Q is the initial sample, J the final sample, T the sample period and $s_{K,j}$ the $j^{th}$ signal for range bin K at the output terminal of divider 56. This signal is multiplied by a factor $K_2$ by multiplier 62 to establish a signal at the input to the VCO 36 that is substantially representative of an average incremental phase shift. The signal substantially representative of the average incremental phase shift from multiplier 62 is coupled to summer 64 wherein it is added to the previous increment which is coupled to summer 64 from the N sample delay line 65. Incremented signals from summer 64 are coupled to cosine and sine generators 66 and 67, wherefrom signals representative of the cosine and sine of the incremented phase signal are coupled to multipliers 68 and 69 wherein they are multiplied by a scale factor $K_1$. These multiplied cosine and sine signals are then coupled to the complex multiplier 36 as $I_2$ and $Q_2$, respectively, and processed with $I_1$ and $Q_1$ derived from the i.f. signal as previously described.

Averaging rain clutter returns in range and azimuth, as above described, lengthens the time response of the system thus reducing the loop bandwidth. This reduced bandwidth significantly inhibits the loop response to rapidly changing signals, such as target returns, minimizing the probability of the cancellation of a target return. Two factors in the averaging process contribute to this minimization; averaging in range reduces the effect of a signal in any one range cell, averaging in azimuth reduces the loop response to rapidly changing signals.

It should be apparent to those skilled in the art that the digital signals $I_N$ and $Q_N$ at terminals 41 and 45 correspond to signals at the output of mixer 11 in FIG. 1. Consequently, to provide a complete clutter canceller, these signals must be passed through a digital MTI canceller as described with reference to FIG. 1. It will also be apparent to those skilled in the art that the signals at terminals 51 and 53 correspond to signals at the output terminals of a single two-pulsed canceller. Consequently, if the MTI canceller is a cascade of N two-pulse cancellers one stage of this cascade may be eliminated by coupling the signals from terminals 51 and 53.

Figure 3:
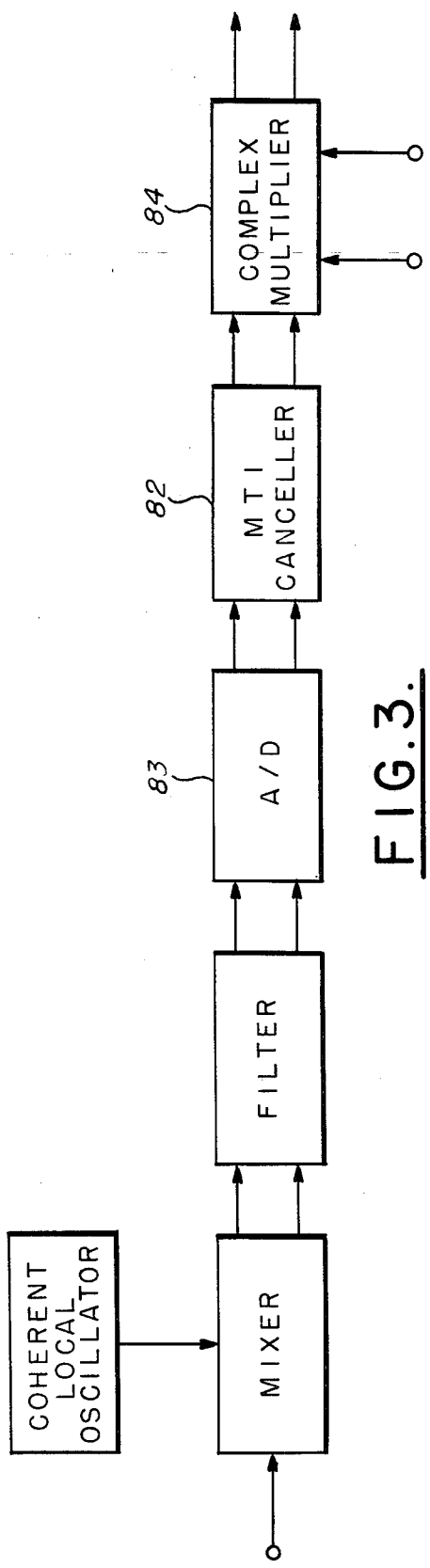
FIG. 3 is a block diagram indicating the placement of an MTI canceller for the elimination of ground clutter within the preferred embodiment of FIG. 2, to form a second preferred embodiment.

In FIG. 1, the MTI canceller 24 is coupled in parallel to the weather clutter cancellation loop. In some applications, it may be desirable for the MTI canceller to precede the weather clutter cancellation loop as shown in FIG. 3. A digital MTI canceller 82 for land clutter rejection is coupled between the A/D converter 83 and the complex multiplier 84, complex multiplier 84 being coupled to the remaining circuitry as explained with reference to FIG. 2. This circuit arrangement provides for the suppression of ground clutter prior to coupling the digital signals to the adaptive weather clutter canceller.

Figure 4:
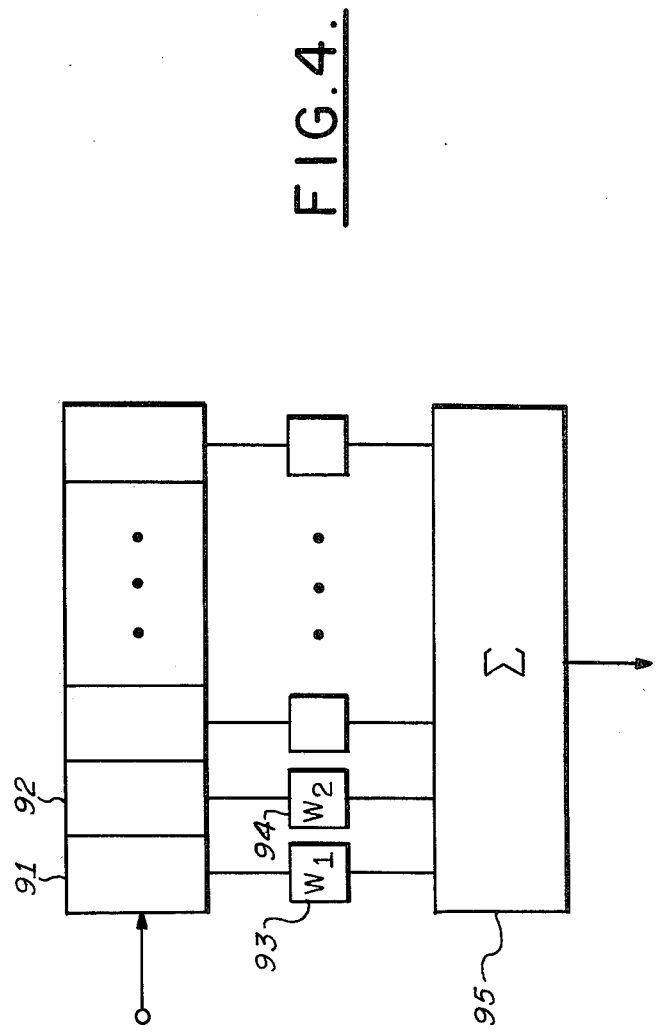
FIG. 4 is a block diagram of a digital weighted summing network.

It is well known in the art that the periodic addition of time separated signals with equal amplitudes exhibits a sin X/X amplitude distribution in the frequency domain. Thus, the summation of the (M+1) range cells establishes such a response and causes bands of light and dark areas about the range bin of interest to appear on the display. These bands create range ambiguities and may mask other real targets. By weighting the signals coupled from each range bin to the summing network as shown in FIG. 4, in accordance with functions well known in the art, the sin X/X response may be modified and sidelobes, resulting from the summation, may be adequately suppressed to eliminate this problem. In FIG. 4, the signal outputs from each cell from the range cells such as 91 and 92 are coupled to multipliers such as 93 and 94 wherefrom the signals emerge with preassigned weights such as $W_1$ from multiplier 93 and $W_2$ from multiplier 94. The weighted signals are then coupled to summing network 95 wherefrom they emerge as a weighted sum.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An adaptive MTI clutter canceller comprising:
    mixer means having input means for receiving signals at first and second frequencies, said second frequency differing from said first frequency by a difference frequency, and output means for providing signals, at said output means, having frequencies representative of said difference frequency;
    delay means having input means coupled to said output means of said mixer means for time delaying said signals at said difference frequencies and for providing said time delayed signals at an output means thereof;

phase comparator means having first input means coupled to said output means of said delay means and second input means coupled to said output means of said mixer means for providing signals at an output means that are representative of phase differences between signals coupled from said output means of said time delay means and said output means of said mixer means;

first averaging means having input means coupled to said output means of said phase comparator means for providing signals representative of an average, over a first predetermined period, of signals coupled from said phase comparator means;

second averaging means coupled to receive said average signal from said first averaging means for providing signals representative of an average, over a second predetermined period, of signals coupled from said averaging means; and means having output means coupled to said input means of said mixer means and input means coupled to receive said average signal from said second averaging means for providing signals having frequencies that are functions of said average signals coupled from said second averaging means.

2. An adaptive MTI clutter canceller in accordance with claim 1 wherein said first averaging means includes:

serially in-parallel out storage means for providing digital signals with predetermined time delays at parallel output means;

sum means coupled to said parallel output means of said storage means for providing signals at output means thereof that are representative of summations of said digital signals with said predetermined time delays; and means coupled to said output means of said sum means for providing signals at output means thereof representative of averages of said sum signals.

3. An adaptive MTI clutter canceller in accordance with claim 2 further including weighting means coupled between said serially in-parallel out storage means and said sum means for applying multiplicative factors to said digital signals with predetermined time delays in accordance with a preselected function.

4. An adaptive MTI clutter canceller in accordance with claims 1, 2, or 3 wherein said second averaging means includes:

first sum means with first input means coupled to receive said average signal from said first averaging means, second input means and output means;

first delay means having input means coupled to said output means of said first sum means and an output means for delaying signals coupled to said input means for a time $T_1$;

second delay means having output means and input means coupled to said output means of said first delay means for delaying signals by a time $T_2$, less than $T_1$, where $T_1 + T_2 = T$;

decay factor means having input means coupled to said output means of said second delay means and output means coupled to said second input means of said first sum means for providing a multiplication of signals coupled from said second delay means by factors less than unity; and constant means having input means coupled to said output means of said first delay means and output means coupled to said signal means for multiplying signals at said output means of said first delay means by a predetermined constant.

5. An adaptive MTI clutter canceller in accordance with claim 4 wherein said mixer means couples digital signals representative of first and second components of said difference frequency signal to said phase comparator and said signal means couples digital signals representative of first and second components of said signals representative of said phase differences to said phase comparator means and wherein said phase comparator means includes:

first multiplier means coupled to receive said first and second digital components from said mixer means and said first and second digital components from said signal means for providing first and second components of signals representative of phase differences between said difference frequency signal and said signal from said signal means;

first loop means having, third delay means coupled to receive said first component from said first multiplier means for providing at output means thereof, delayed digital signals with a delay time T, first difference means coupled to receive said first component from said first multiplier means and said delayed signal from said third delay means for providing at output means thereof, digital signals representative of differences between said first component from said multiplier means and said delayed signal; second loop means having, fourth delay means coupled to receive said second component from said first multiplier means for providing, at output means thereof, time delayed signals with delay time T, second difference means coupled to receive said second component from said first multiplier means and said delayed signal from said fourth delay means for providing, at output means thereof, digital signals representative of differences between said second component from said multiplier means and said delayed signal from said delay means, second multiplier means coupled to receive said difference signals from said first difference means and to receive said second component from said first multiplier means for multiplying said difference signal of said first difference means and said second component from said first multiplier means and providing a signal representative of said multiplication at output means thereof;

third multiplier means coupled to receive said difference signal from said second difference means and said first component from said first multiplier means for multiplying said difference signal from said second difference means and said first component from said first multiplier means and providing a signal representative of said multiplication at an output means thereof; and third difference means coupled to receive said representative signal from said second and third multiplier means for providing signals representative of differences between said representative signals from said second multiplier means and said representative signal from said third multiplier means.

6. An adaptive MTI clutter canceller in accordance with claim 5 further including means coupled to receive said first and second components from said first multiplier means for providing at output means thereof signals with clutter substantially cancelled therefrom.

7. An adaptive MTI clutter canceller in accordance with claim 5 further including means coupled between said first multiplier means and said mixer means for coupling signals to said multiplier means with clutter substantially cancelled therefrom.

8. An adaptive MTI clutter canceller in accordance with claim 5 further including means coupled to said output means of said first and second difference means for providing at output means thereof signals with clutter substantially cancelled therefrom.

9. An adaptive MTI clutter canceller in accordance with claim 4 wherein said signal means includes:
   second sum means having first input means coupled to said output means of said constant means, second input means and output means for providing signals representative of sums of signals at said first and second input means;
   fifth delay means having input means coupled to said output means of said second sum means and output means coupled to said second input means of said second sum means for delaying signals coupled from said output means of said second sum means by a time T;
   cosine generator means having input means coupled to said output means of said second sum means and output means coupled to said first multiplier means for providing signals representative of cosines of signals coupled from said second sum means, said cosine signals being said first component of said second signal; and
   sine means having input means coupled to said output means of said second sum means, and output means coupled to said first multiplier means for providing signals representative of sines of signals coupled from said sum means, said sine signals being said second component of said second signal.

10. A method for cancelling doppler shifted clutter comprising the steps of:
   mixing a signal representative of said doppler shifted clutter at a time t, said signal having a representative frequency, with a first signal having a first frequency from a VCO to obtain a signal having a frequency that is determined by differencing said representative frequency and said first frequency;
   delaying said difference frequency signal by a time T to obtain a time delayed signal, T being an elapsed time after said time delay;
   comparing said time delayed signal with a signal representative of said doppler shifted clutter at a time substantially T+t to obtain a signal representative of the phase difference between said time delayed signal and said representative signal at time T+t;
   averaging said phase difference over a first predetermined time interval to obtain a first average signal;
   averaging said first time average signal over a second predetermined time interval to obtain a second time average signal; and
   controlling said voltage controlled oscillator with said second time average signal.

11. A method for cancelling doppler shifted clutter in accordance with claim 6 wherein said mixing step includes:
   mixing said representative signal with a signal from a coherent oscillator and with said signal from said coherent oscillator phase shifted 90° to obtain components in-phase and in-quadrature with said coherent oscillator;
   converting said in-phase and quadrature components to digital signals;
   multiplying said in-phase and in-quadrature components from said analog-to-digital conversion with said in-phase and in-quadrature components from said voltage controlled oscillator to obtain in-phase and in-quadrature components of said difference frequency signal in digital format.

* * * * *